United States Patent [19]
Kardon et al.

[11] 3,929,289
[45] Dec. 30, 1975

[54] PLUG FOR PLUG NOZZLES

[75] Inventors: Samuel Kardon, Raleigh, N.C.; Carlton J. Curry, Potomac Park, Md.

[73] Assignee: The United States of America as represented by the Secretary of the Navy, Washington, D.C.

[22] Filed: Dec. 23, 1968

[21] Appl. No.: 788,989

[52] U.S. Cl. .......................................... 239/265.11
[51] Int. Cl.² ........................................ B63H 11/00
[58] Field of Search .......... 239/265.11; 60/242, 271

[56] References Cited
UNITED STATES PATENTS

| | | | |
|---|---|---|---|
| 3,156,091 | 11/1964 | Kraus | 239/265.11 |
| 3,309,026 | 3/1967 | Loprete | 239/265.11 |
| 3,332,243 | 7/1967 | Wilson | 60/271 |

*Primary Examiner*—Samuel Feinberg
*Attorney, Agent, or Firm*—Joseph C. Warfield; John W. Pease; John F. Miller

[57] ABSTRACT

A plug for rocket motor plug nozzles has a shell constructed of a thermally anisotropic material, bulk preoriented pyroltic graphite. The shell material is oriented to serve as both an insulator and as a heat conductor to divert heat to various heat sinks. Resilient fastening means are employed to allow relative movement of parts to minimize the effects of thermal stresses.

1 Claim, 1 Drawing Figure

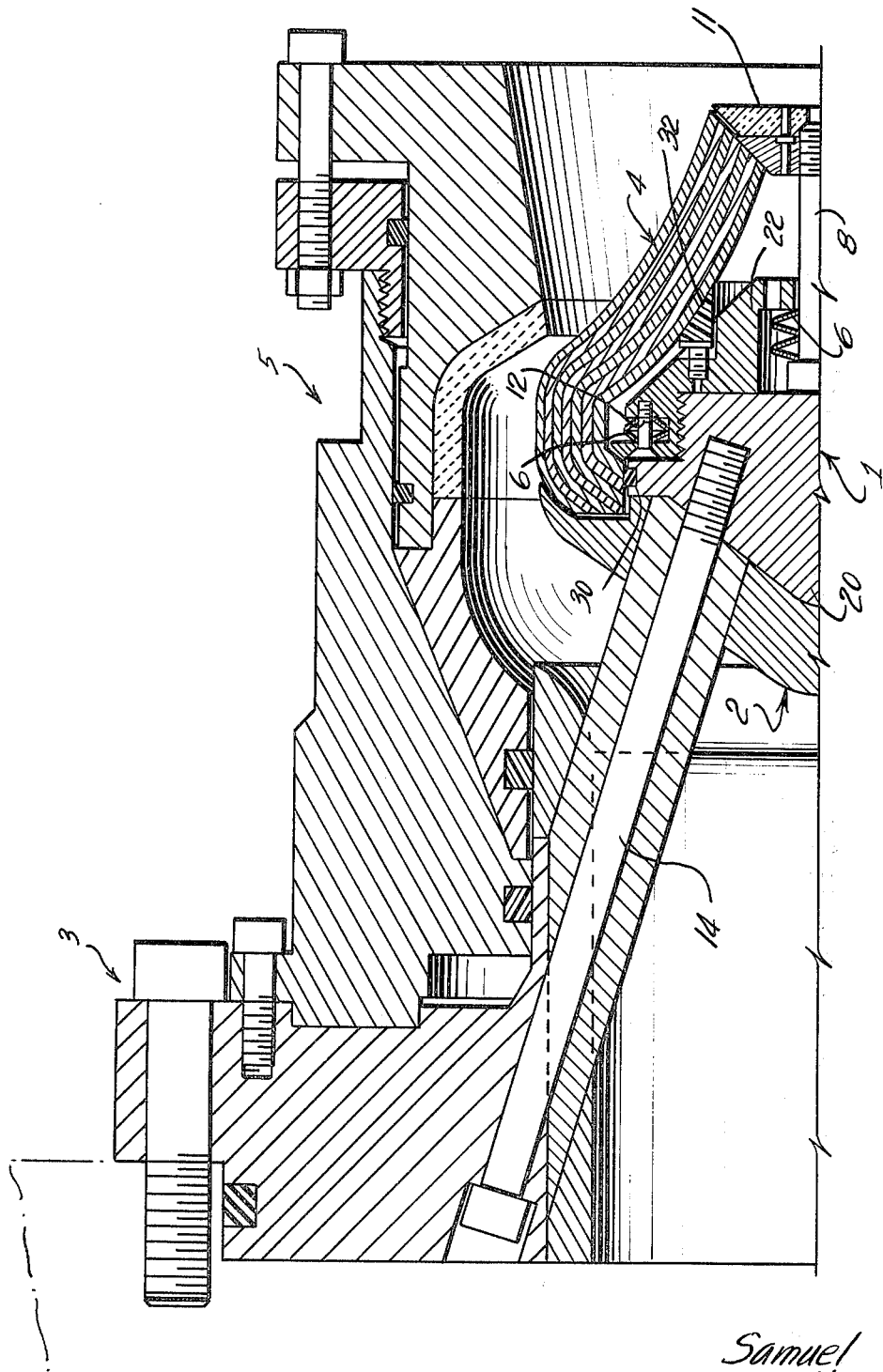

PLUG FOR PLUG NOZZLES

BACKGROUND OF THE INVENTION

The invention is in the field of rocket motors. Rocket motors employ nozzles of various designs through which hot gases are expelled to generate thrust. One design consists of an annular ring or cowl concentric with a plug which partially obstructs the opening formed by the cowl. In some such designs the cowl may be movable with respect to the plug to vary the throat area of the nozzle. Among the problems inherent in this design are the difficulty of constructing a plug which is aerodynamically acceptable and which will stand up under the extreme heat, pressure, and erosive effects of the hot gases generated during firings of long durations. Refractory materials have been used in various plug designs but the problems of thermal stress and degradation within the material have not been solved heretofore. The protection of relatively delicate seals from heat and the accommodation of dimensional changes in the components comprising the plug which are caused by heat and/or pressure are additional problems which have not been completely solved in the prior art.

SUMMARY OF THE INVENTION

The invention is a plug for spike or plug nozzles which utilizes a shell made of an advanced refractory material, bulk preoriented pyrolytic graphite in a unique manner to provide heat protection for interior parts and heat sink cooling for the shell. Resilient fastening means are used to accommodate dimensional changes within the plug structure caused by the heat of combustion. The plug design is aerodynamically efficient and is shaped and constructed to minimize the effects of thermal stresses and the erosion caused by the flow of hot gases under high pressures.

BRIEF DESCRIPTION OF THE DRAWING

The drawing illustrates the principles of the invention.

DESCRIPTION OF THE PREFERRED EMBODIMENT

In the drawing the invention is shown as plug 1 which is supported in the opening formed by a cowl 5 by cap screws 14, only one of which is shown. The drawing shows only the upper half of the rocket motor nozzle since the bottom of the drawing is on a center line through the nozzle. The head of cap screw 14 is located in the body 3 of a rocket motor. Cowl 5 may be movable with respect to plug 1 to change distance between cowl and plug to thereby vary the throat area of the rocket motor nozzle formed by cowl and plug. The structure of rocket motor body 3 and cowl 5 form no part of this invention. Plug 1 is shown in simplified form to illustrate the principles of the invention. Plug 1 is essentially formed of a forward shell 2, aft shell 4, a forward core 20, an aft core 22, a retainer disk 10 which is fastened to aft core 22 by cap screw 8, and an insulator disk 11. Support cap screws 14 are threaded into the forward core 20 which is made of a suitable high temperature alloy. Aft core 22 is an assembly of parts in the actual apparatus, two of which are shown fastened together with cap screws 12, only one of which is shown. Forward shell 2 and insulator disk 11 are made of asbestos-phenolic material as is the insulation shown around cap screw 14. Aft shell 4 is made of several laminations of bulk preoriented pyrolytic graphite. An "O" ring 30 seals the joint between forward core 20 and aft shell 4. A teflon ring 32 is fastened to aft core 22 and bears against aft shell 4. It is apparent that when cowl 5 is caused to move and thereby change the distance between the cowl and plug 1, thereby changing the area of the exit space for the escaping gases, the thrust of the rocket motor is changed.

The bulk preoriented pyrolytic graphite laminations used in the aft plug shell 4 are highly anisotropic with respect to the conductivity of heat. Heat moves through the laminations in a direction normal to their outer surface very slowly, but is conducted rapidly along their length. Thus the extreme heat developed between the cowl 5 and plug 1 due to the flow of hot gases under high pressure penetrates the laminations of shell 4 to the inner parts of the plug very slowly, thus protecting the inner plug parts from extreme heat and from the damaging effects of excessive dimensional changes caused by heat. Such dimensional changes as do occur are accommodated by the spring washers 6 which are used with various fastening members. For example, a spring washer 6 is shown on cap screw 12 which fastens two parts of aft plug core 22 together. Another spring washer 6 is shown under the head of the cap screw 8. Seal 30 is protected from heat as is ring 32. It is most important that seals such as 30 be protected from excessive heat since good sealing properties and heat resistance are generally mutually non-compatible characteristics in sealing materials. Thus the insulating properties of the bulk preoriented pyrolytic graphite used in aft plug shell 4 permit the use of a seal 30 with superior sealing properties. Additionally, the ability of the graphite laminations in shell 4 to conduct heat in a direction parallel to their long dimension provides additional heat protection to the inner and other parts of plug 1 by conducting the heat absorbed from the hot gases to a forward heat sink consisting of forward plug shell 2 and to an aft heat sink consisting of insulator disk 11. Thus the unique properties of the materials employed and the unique structure of applicants' device combine to form a plug which will withstand the extreme heat and pressure of sustained firings without failure from thermal stress and the resulting interior degradation. In addition to its insulating and conducting qualities, bulk preoriented pyrolytic graphite has been found to be highly resistant to erosion from the hot gases of combustion. Excessive erosion was a frequent cause of plug failure in the prior art devices. Another advantage of applicants' design is that the aft plug shell is supported in compression at a maximum number of points, this is highly desirable because bulk preoriented pyrolytic graphite is, like most materials, stronger in compression than in tension or shear. The plug described can be used with plug or spike nozzles which offer considerable advantages in space and weight savings and/or greater efficiency compared with Venturi, DeLaval, convergent-divergent, or other nozzles with relatively long exit sections.

The variable throat area nozzle which is usable with applicants' novel plug can effect thrust modulation or termination and can correct for factors which cause deviations in thrust.

It is claimed:

1. In a rocket motor having a variable area nozzle formed by a moveable cowl portion surrounding a plug member, the improvement comprising:

a plug member comprising inner and outer components, said inner components comprising a forward core, an aft core, and a retainer disk, first resilient means for fastening said forward core to said aft core and second resilient means for fastening said aft core to said retainer disk, said resilient means enabling expansion of said plug components in the presence of heat, said outer component comprising a forward shell, an aft shell, and an insulator disk, said forward shell and said insulator disk being comprised of asbestos-phenolic material, said aft shell being comprised of plural laminations of bulk preoriented pyrolytic graphite, said laminations of pyrolytic graphite being oriented to conduct heat of combustion to said forward shell and to said insulator disk and to insulate said inner components from heat to minimize dimensional changes in said inner components resulting from the heat of combustion and to thereby protect said plug from structural failure, said inner components being adapted to support said outer components to thereby provide dimensional stability to said plug member.

* * * * *